US011188362B2

(12) United States Patent
Bregman et al.

(10) Patent No.: US 11,188,362 B2
(45) Date of Patent: Nov. 30, 2021

(54) GENERATING A COMMAND LINE INTERFACE FOR PROJECTS BASED ON CONFIGURATION MANAGEMENT TECHNOLOGIES

(71) Applicant: Red Hat, Inc., Raleigh, NC (US)

(72) Inventors: Arie Bregman, Raanana (IL); Eran Kuris, Raanana (IL)

(73) Assignee: Red Hat, Inc., Raleigh, NC (US)

(*) Notice: Subject to any disclaimer, the term of this patent is extended or adjusted under 35 U.S.C. 154(b) by 247 days.

(21) Appl. No.: 16/424,666

(22) Filed: May 29, 2019

(65) Prior Publication Data
US 2020/0379788 A1 Dec. 3, 2020

(51) Int. Cl.
G06F 9/46 (2006.01)
G06F 9/455 (2018.01)
H04L 29/08 (2006.01)

(52) U.S. Cl.
CPC ...... G06F 9/45512 (2013.01); G06F 9/45533 (2013.01); H04L 67/10 (2013.01)

(58) Field of Classification Search
CPC ... G06F 9/45512; G06F 9/45533; H04L 67/10
See application file for complete search history.

(56) References Cited

U.S. PATENT DOCUMENTS 6,426,959 B1* 7/2002 Jacobson ............ H04L 41/0896
                                                    370/316
7,349,761 B1* 3/2008 Cruse .................. G05B 19/042
                                                    700/276
2005/0050354 A1* 3/2005 Gociman .............. H04L 63/101
                                                    726/4
2005/0251772 A1* 11/2005 Youngman .............. G06F 30/30
                                                    716/102
2007/0208686 A1* 9/2007 Gupta ..................... H04L 67/02

(Continued)

OTHER PUBLICATIONS

Github, Inc., "CID—Command Interface Description Language", https://github.com/zeljko-bal/CID, 2019, 2 pages.

(Continued)

Primary Examiner — Emerson C Puente
Assistant Examiner — Zhi Chen
(74) Attorney, Agent, or Firm — Lowenstein Sandler LLP

(57) ABSTRACT

Implementations for generating a command line interface (CLI) for projects based on configuration management technologies are described. An example method may include maintaining a CLI specification file for a project that is executable by a configuration management system, the CLI specification file specifying an entry point to cause execution of the project, a command to invoke the project via the entry point, and option parameters of options of the project, receiving an invocation request for the project via a user input of the command, verifying that arguments of the invocation request are valid in view of the option parameters of the CLI specification file, and responsive to verifying that the arguments are valid, generating a CLI for the project in view of the CLI specification file, the CLI to cause the project to be executed by the configuration management system using the entry point.

20 Claims, 6 Drawing Sheets

(56) References Cited

U.S. PATENT DOCUMENTS

| | | | |
|---|---|---|---|
| 2009/0150773 A1* | 6/2009 | Falkner | G06F 9/453 715/700 |
| 2009/0199187 A1* | 8/2009 | Cervantes | G06F 9/4843 718/101 |
| 2009/0216869 A1* | 8/2009 | Kennedy | H04L 67/36 709/223 |
| 2013/0261611 A1* | 10/2013 | Dhar | A61B 6/4423 606/1 |
| 2013/0325899 A1* | 12/2013 | Mohaban | G06F 16/17 707/791 |
| 2014/0101291 A1* | 4/2014 | Johnston | G06F 16/958 709/219 |
| 2015/0095923 A1* | 4/2015 | Sarid | G06F 8/30 719/328 |
| 2015/0278448 A1* | 10/2015 | Weegar, Jr. | G16H 40/67 707/622 |
| 2016/0308953 A1* | 10/2016 | Anschutz | H04L 67/10 |
| 2018/0034924 A1* | 2/2018 | Horwood | H04L 67/16 |
| 2018/0053328 A1* | 2/2018 | Simonovic | G06F 8/433 |
| 2018/0307525 A1* | 10/2018 | Gates | G06F 3/0483 |
| 2018/0321918 A1 | 11/2018 | McClory et al. | |
| 2018/0322019 A1* | 11/2018 | Stowell | G06F 9/4843 |
| 2019/0034484 A1* | 1/2019 | Das | G06N 3/08 |
| 2019/0050210 A1 | 2/2019 | Van Der Jeugt et al. | |

OTHER PUBLICATIONS

Dittrich, Dave, "An Overview of Chef", https://docs.chef.io/chef_overview.html, Oct. 25, 2018, 12 pages.

Freire, Fernando, "Introducing signal_analog, the troposphere-like Library for Automating Monitoring Resources", https://medium.com/nikeengineering/introducing-signal-analog-the-troposphere-like-library-for-automating-monitoring-resources-c99eb8c2dca7, Jul. 18, 2018, 10 pages.

Janota, Mikolas et al., School of Computer Science and Informatics, Lero—The Irish Software Engineering Research Centre, and The Complex and Adaptive Systems Laboratory (CASL), University College Dublin, Ireland, "CLOPS: A DSL for Command Line Options", http://sat.inesc-id.pt/~mikolas/JanotaEtAI09.pdf, 2009, 24 pages.

Guru99, "Best 8 Ansible Alternatives in 2019", https://www.guru99.com/ansible-alternative.html, 2019, 8 pages.

Dittrich, Dave, "D2 Ansible playbooks Documentation", https://media.readthedocs.org/pdf/d2-ansible-dims-playbooks/latest/d2-ansible-dims-playbooks.pdf, Oct. 25, 2018, 150 pages.

* cited by examiner

GENERATING A COMMAND LINE INTERFACE FOR PROJECTS BASED ON CONFIGURATION MANAGEMENT TECHNOLOGIES

TECHNICAL FIELD

The disclosure is generally related to configuration management in computer systems, and more particularly, to generating a command line interface for projects based on configuration management technologies.

BACKGROUND

Configuration management is a systems engineering process for establishing and maintaining consistency of a product's performance, function, and physical attributes with the product's requirements, design, and operational information throughout the lifetime of the product. Configuration management tools, such as configuration management software, provide information technology (IT) engines that support provisioning, configuration management, orchestration, and application deployment in a distributed system. Configuration management tools can also track and control changes in hardware and software deployed in the distributed system.

BRIEF DESCRIPTION OF THE DRAWINGS

The disclosure is illustrated by way of examples, and not by way of limitation, and may be more fully understood with references to the following detailed description when considered in connection with the figures, in which.

DETAILED DESCRIPTION

Figure 1:
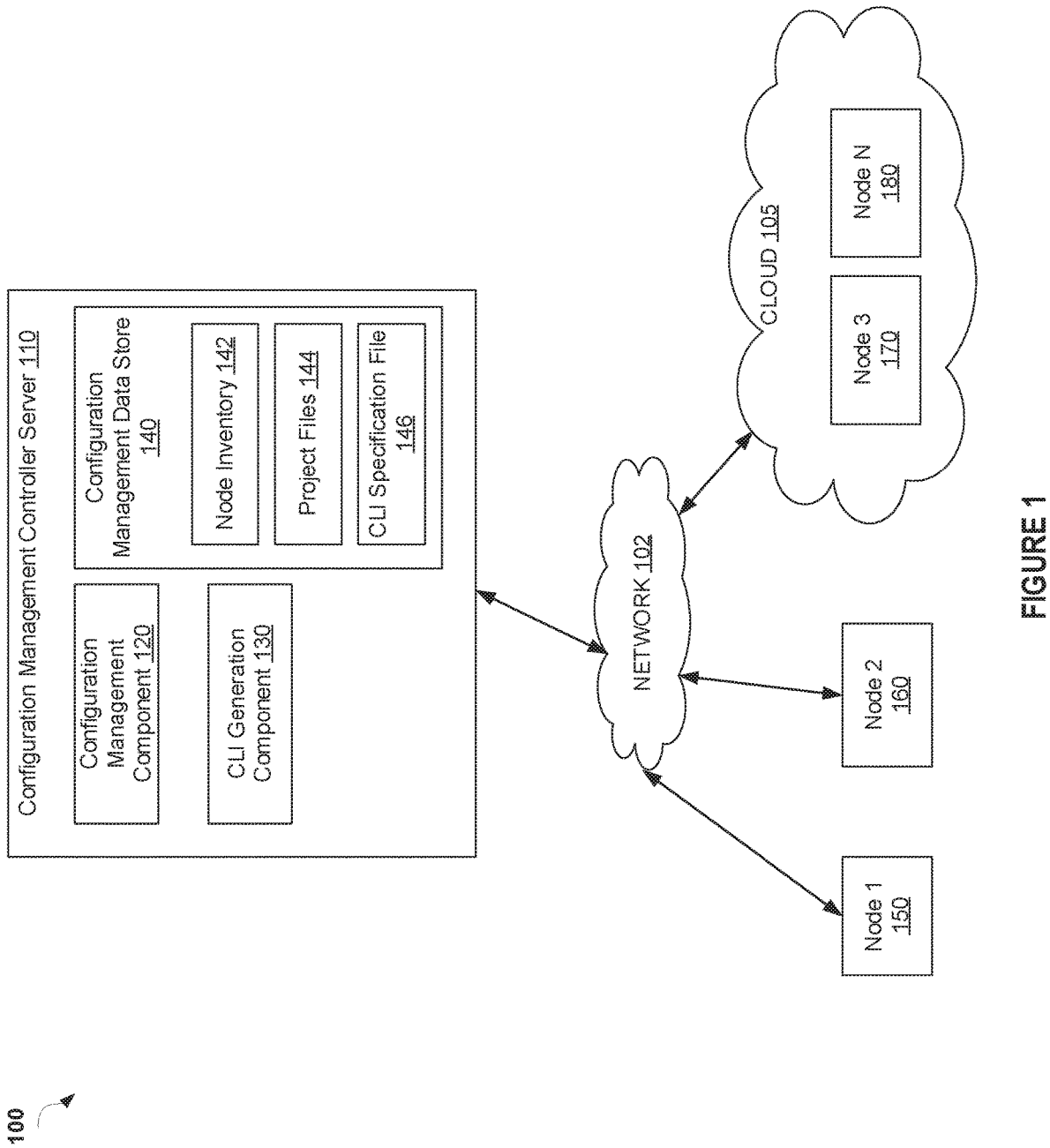
FIG. 1 depicts a high-level block diagram of an example computer system architecture, in accordance with one or more aspects of the disclosure.

Described herein is a system for generating a command line interface (CLI) for projects based on configuration management technologies. Implementations of the disclosure enable a configuration management system to create a user-friendly CLI for executing a project of the configuration management system that implements a domain specific language (DSL). A DSL may refer to a computer language specialized to a particular application domain. A CLI may refer to an interface for interacting with a computing program where a user device issues commands to the program in the form of successive lines of text. A project refers to software code or script that automates the provisioning, configuration, orchestration, and/or deployment of applications to nodes of the configuration management system. A project may be referred to herein as a "project file" or "playbook" of the configuration management system.

In a DSL-based configuration management system, the execution of the project may be accomplished by a domain program via CLI commands and arguments. The configuration management system may utilize its own specific DSL for generating the project files of the configuration management system. While it can be a straightforward task to generate (e.g., write) a project file for a DSL-based configuration management platform, it is not always simple to facilitate the execution of such project files in a DSL-based configuration management system.

Conventionally, to execute a project in a DSL-based configuration management system, the project is invoked using a CLI command in the specific DSL of the DSL-based configuration management system. However, using a CLI command in a DSL-based configuration management system can be problematic. For example, some projects may include dozens, if not hundreds, of entry points (e.g., code location where the first instructions in a program are executed, and where the program has access to command line arguments) to run the project. Without proper documentation or naming, it can be a challenging task to determine which entry point to use in order to run the project. Such projects often do not explicitly state what input should be provided to invocate (e.g., invoke, execute) a project at a particular entry point. Moreover, even if proper documentation is in place, this documentation does not prevent users from invocating projects with missing input and/or at an incorrect entry point. This can result in computing inefficiencies, such as executing tasks for potentially extended periods until the last task of the project file that requires the input is executed and the deployment of the project is terminated due to missing input. Another drawback is that there is no input verification performed by conventional DSL-based configuration management systems on the deployment of projects. As such, even if all required input was provided to deploy a project, but some values were passed into the argument in the wrong format (e.g., a list instead of number), then this error is not immediately identified. As a result, a user may only become aware of the error when reaching the particular task of the project that utilizes the invalid input, which can result in execution inefficiencies in the computing devices of the configuration management systems.

Aspects of the disclosure address the above and other deficiencies by providing technology that generates a CLI for projects that use DSL-based configuration management technologies. In one implementation, the configuration management system utilizes a CLI specification file provided to the configuration management system in a determined format. The format of the CLI specification file may describe the characteristics and format details of a project files of the configuration management system. Based on the content of the CLI specification file, the configuration management system can generate a CLI for a project of the configuration management system.

In one implementation, the configuration management system may process each pertinent section of the CLI specification file and generate the CLI to cause the project of the DSL-based configuration management system to be executed. The configuration management system may utilize the CLI specification file to perform verification of the user input prior to generating a CLI. The configuration management system can utilize option parameters defined in the CLI specification file to verify whether user-provided arguments in an invocation of the project are valid. As a result, the configuration management system can generate a user-friendly CLI for invoking DSL-based projects, with the ability to verify that required input was provided in a correct format.

As such, the systems and methods described herein include technology that enhances utilization of computing resources, such as processor usage and memory usage, for a computer system. In particular, aspects of the disclosure provide technology that enhances the efficiency and/or performance of a computing system by preventing unnecessary execution of a project of a DSL-based configuration management system when an invalid invocation of the project is received. This may enhance the efficiency and performance of the computer system by improving error detection in the invocation based on a CLI specification file provided to the configuration management system.

Various aspects of the above referenced methods and systems are described in details herein below by way of examples, rather than by way of limitation.

FIG. 1 is a block diagram of a network architecture 100 in which implementations of the disclosure may operate. In some implementations, the network architecture 100 may be used to implement a configuration management system to in accordance with implementations of the disclosure. The configuration management system supports provisioning, configuration management, orchestration, and application deployment in a distributed system implemented using network architecture 100. In one implementation, the network architecture 100 includes a configuration management controller server 110 communicably coupled via a network 102 to one or more nodes 150, 160, 170, 180. Network 102 may be a private network (e.g., a local area network (LAN), a wide area network (WAN), intranet, or other similar private networks) or a public network (e.g., the Internet).

A node 150-180 can provide computing functionality execute applications and/or processes associated with the applications. For example, nodes 150-180 may include, but are not limited to, application servers, database servers, content servers, load balancers, monitoring systems, alert systems, and so on. In one implementation, each node 150-180 may be hosted on any type of computing device, such as a server computer system, a desktop computer or any other computing device. In one implementation, one or more of the nodes 150-180 may be hosted in a cloud-computing environment 105 (also referred to herein as a cloud). For example, cloud 105 may include nodes 170, 180. In some implementations, a node 150-180 is implemented as a virtual machine (VM) that is hosted on a physical machine (e.g., host machine) implemented as part of the cloud 105. In some implementations, a node 150-180 is implemented as a container that is hosted on a physical machine implemented as part of the cloud 105. A container is a standard unit of software that packages up software code and all its dependencies so that an application runs quickly and reliably from one computing environment to another. A container image may be executed in the container, where the container image is a lightweight, standalone, executable package of software that includes all items used to run an application, such as software code, runtime, system tools, system libraries and settings. When nodes 170-180 are implemented as VMs or containers, for example, the nodes 150-180 may be executed by operating systems (OSs) on host computing machines. In some implementations, the nodes 150-180 are located in a data center.

In one implementation, the configuration management system implemented in network architecture 100 includes a configuration management controller server 110 that manages the orchestration of the configuration management system. For example, the configuration management controller server 110 can manage the provisioning, configuration, orchestration, and/or application deployment of one or more nodes of a configuration management system. As such, the configuration management controller server 110 may handle the provisioning, configuration, orchestration, and application deployment with respect to nodes, such as nodes 150-180, of the configuration management system. Although illustrated in FIG. 1 as a single machine, the configuration management controller server 110 may reside on one or more machines (e.g., server computers, desktop computers, etc.)

In one implementation, the configuration management controller server 110 include a configuration management component 120, a CLI generation component 130, and a configuration management data store 140. Although the configuration management component 120, the CLI generation component 130, and the configuration management data store 140 are illustrated as residing on a single machine, these components may be distributed across multiple separate machines implementing the functionality of the configuration management controller server 110. The configuration management component 120 manages nodes 150-180 and includes functionality to provision, configure, orchestrate, and/or deploy applications to the nodes 150-180 in the configuration management system.

In one implementation, the configuration management component 120 maintains an inventory 142 of the nodes 150-180 in the configuration management data store 140. In one implementation, the configuration management data store 140 may be a memory (e.g., random access memory), a cache, a drive (e.g., a hard drive), a flash drive, a database system, or another type of component or device capable of storing data. The configuration management data store 140 may also include multiple storage components (e.g., multiple drives or multiple databases) that may also span multiple computing devices (e.g., multiple server computers).

In one implementation, configuration management component 120 accesses one or more project files 144 to utilize in provisioning, configuring, and/or deploying applications to nodes 150-180. The project files 144 may include software code or script that automates the provisioning and/or configuration or nodes 150-180 by the configuration management component 120. In one implementation, a project file 144 may define the work to be done for a configuration of a node 150-180 managed by the configuration management controller server 110. In one implementation, the project files 144 may be written in YAML (YAML Ain't Markup Language) (.yml) file format. The project file 144 may be written by an administrator with environment-specific parameters for the node 150-180.

In one implementation, execution of the project file 144 may cause an automated provision and/or configuration process to be executed with respect to a node 150-180. For example, the execution of the project file 144 may include, but are not limited to, deploying a project on a node 150-180, installing a software package on a node 150-180, initializing a cloud-based infrastructure on a node 150-180, and many other tasks for configuration management, network device management, infrastructure maintenance, and so on. In one implementation, the project file 144 is considered an organized unit of scripts that can be executed against one or more nodes 150-180. In some implementations, the project file 144 is referred to as a module that can be executed against one or more of the nodes 150-180 to cause one or more processes to be performed with respect to the nodes 150-180. In some implementations, a project file 144 may be referred to herein as a "project" or "playbook" of the configuration management system.

The execution of the project file 144 may be accomplished via a domain program using CLI commands and arguments. As such, the configuration management controller server 110 may include a CLI generation component 130 that enables the execution of project files 144 against nodes 150-180 of the configuration management system. As discussed above, the configuration management system may utilize its own specific DSL for generating the project files 144 (e.g. projects, playbooks) of the configuration management system. Moreover, as noted above, invocating (e.g., invoking) these DSL-based projects using a CLI can be a complicated task due to multiple entry points for the project, lack of clear documentation of required inputs for the project, and lack of input verification for the projects. As such, in implementations of the disclosure, the CLI generation component 130 automatically generates, using a defined CLI specification file, a CLI for execution of a DSL-based project of the configuration management system.

In one implementation, the CLI generation component 130 utilizes a CLI specification file 146 provided to the configuration management controller server 110 in a determined format. The CLI specification file 146 may be written and provided by a user of the configuration management system. The format of the CLI specification file 146 may describe the characteristics and format details of a project (as defined in a project file 144) of the configuration management system. In one implementation, the CLI specification file 146 may be written in a YAML (.yml) format. Based on the content of the CLI specification file 146, the CLI generation component 130 can generate a CLI for a project of the configuration management system.

Figure 2:
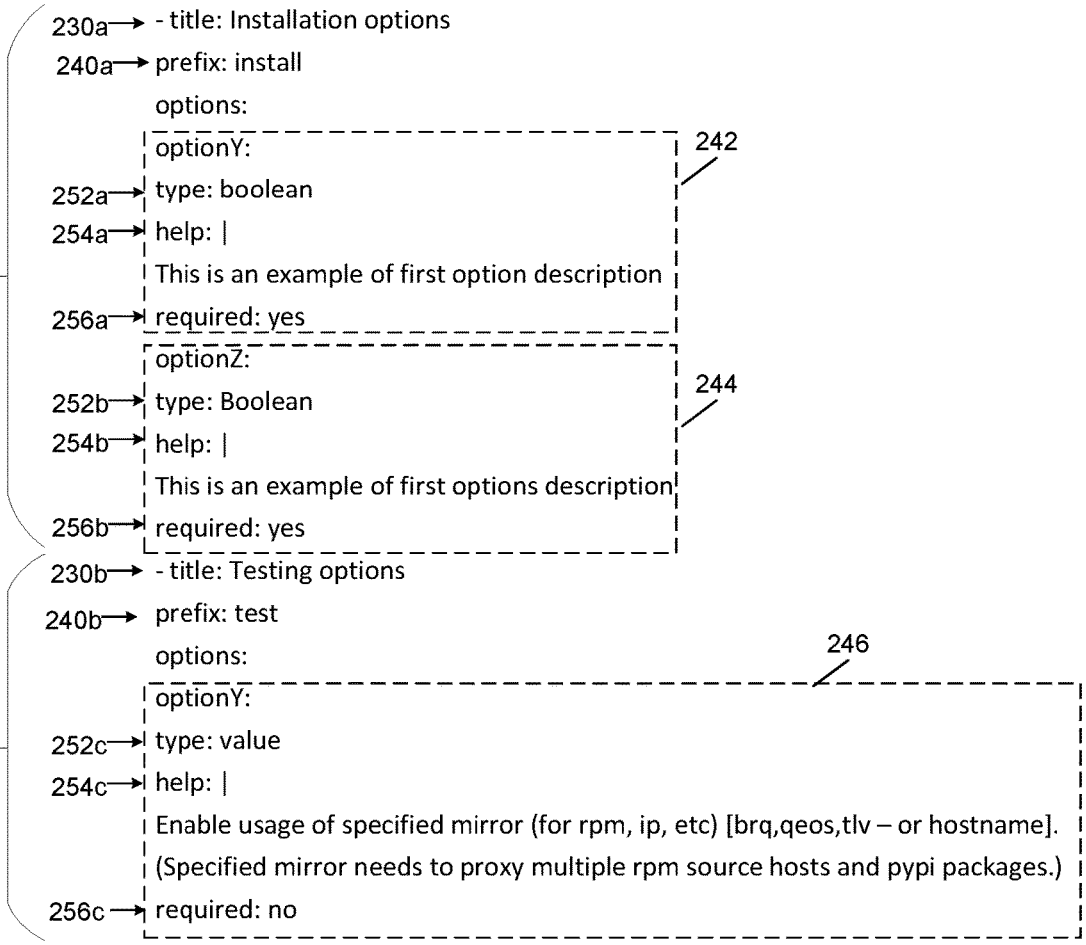
FIG. 2 depicts an example command line interface (CLI) input file according to one or more aspects of the disclosure.

FIG. 2 is an example depiction of a CLI specification file 200 generated by a configuration management controller server, in accordance with implementations of the disclosure. In one implementation, the CLI specification file 200 is the same as CLI specification file 146 described with respect to FIG. 1. The CLI specification file 200 shown in FIG. 2 can be inputted via a graphical user interface (GUI) of a user device. As shown in FIG. 2, the example CLI specification file 200 is written in a YAML file type format. Other definition formats and file types may also be utilized in implementations of the disclosure. The example CLI specification file 200 is described below in terms of generating a CLI for a project (e.g., project file 144) of a configuration management system, such as the configuration management system of network architecture 100 described with respect to FIG. 1.

The example CLI specification file 200 includes a first line for a main entry 202. The main entry 202 indicates an entry point that should be executed when the user runs a command 205 for executing the project. The second line in CLI specification file 200 is for the command 205. The command 205 defines how the user should invocate (invoke) the project. In one implementation, invocation (invocate, invoke) refers to the execution of a program or function. As such the command 205 indicates the value used to execute the project of the configuration management system. In some implementations, the command 205 may be an optional value when utilized in configuration management systems that can directly read the CLI specification file 200.

For example, if a user caused execution of the configuration management system without using any arguments or commands, the configuration management system may be configured to search for the defined CLI specification file and start execution based on the main entry 202 value.

The CLI specification file 200 further defines parsers 210 for the project. One or more different parsers may be defined for a project. In some implementations, a configuration management system may support projects that include one or more different sub-projects. Defining more than one parser 210 in the CLI specification file 200 allows for a separate CLI to be generated for each sub-project of the project. As illustrated in FIG. 2, CLI specification file 200 includes a parser for 'app-x', referred to as app-x parser 215a (may be considered sub-project 1) and a parser for 'app-y', referred to as app-y parser 215b (may be considered sub-project 2) with corresponding descriptions 220a, 220b. Each of the app-x and app-y parsers 215a, 215b in the CLI specification file 200 may have different groups 225a. The groups 225a may refer to logic groups that allow for the separation of groups of options based on what the options affect/execute. For example, CLI specification file 200 includes a group 232 for the 'app-x' parser 215a titled "Installation options" 230a and another group 234 for the 'app-x' parser 215a titled "Testing options" 230b. Each group 232, 234 of options may delineate one or more individual options. For example, the Installation options group 232 includes 'optionY' 242 and 'optionZ' 244. The Testing options group 234 includes 'optionY' 246. Each group 232, 234 may also be associated with a defined prefix 240a, 240b. The Installation options group 232 includes a prefix 240a of 'install' and the Testing options group 234 includes a prefix 240b of 'test'. The prefix 240a, 240b for group 232, 234 help separately identify the option group in the generated CLI. Although not specifically illustrated in FIG. 2, the 'app-y" parser 215b may also include groups 225b of defined options.

The CLI specification file 200 further defines different parameters for each option 242, 244, 246. The defined parameters may include, but are not limited to, type 252a-c, help 254a-c, and required 256a-c. Type 252a-c may refer to a type of input the user should provide for the option, such as string value, Boolean, comma-separated list, and so on. Help 254a-c may refer to a description of the options that can be displayed to the user. Required 256a-c may specify whether the user must provide the input. As an example, CLI specification file 200 includes an option called 'optionY' 242 which indicates a Boolean 252a value is required 256a. As such, one possible invocation of the project defined in CLI specification file 200 is 'my_project-install-optionY True'. If the CLI specification file is used in an example Ansible configuration management system, then the invocation above causes the CLI command 'ansible-playbook bin/main.yml-extra-vars install-optionY=True' to be generated.

Referring back to FIG. 1, as discussed above, in one implementation, the CLI specification file 146 may be written and provided by a user (e.g., system administrator) of the configuration management system. The configuration management system (e.g., configuration management component 120 or CLI generation component 130) may provide the user with a sequence of dialog boxes (e.g., a wizard or assistant) that guide the user through a series of defined operations to generate the CLI specification file 146. For example, the series of defined operations may query the user for each of the inputs of the CLI specification file 200. In some implementations, the configuration management system (e.g., configuration management component 120 or CLI generation component 130) may provide a template of the CLI specification file 146 that the user may emulate to generate the particular CLI specification file 146 for the project (e.g., project file 144).

The CLI specification file 146 may be accessed by the CLI generation component 130 responsive to a user invoking a command that refers to the CLI specification file 146. For example, the command 'my_project-install-optionY True' discussed above, may cause the CLI generation component 130 to access and utilize the defined CLI specification file 146 referred to by the 'my_project' command. In some implementations, as discussed above, the CLI specification file 146 can be accessed by default upon execution of the configuration management system without the user specifically issuing a command corresponding to the CLI specification file 146.

In some implementations, a user may utilize a help command supported by the CLI specification file 146 to better understand the options supported by the project as defined by the CLI specification file 146. With respect to the example CLI specification file 200 described in FIG. 2, a user can invoke the 'my_project—help' command to display the help information (e.g., help parameter 254a-c) defined in the CLI specification file 200. The help information displayed may assist a user in better understanding the options supported by the project. If a user mistakenly executes a wrong option, the configuration management component 120 may display a message informing of an error and, in some implementations, can provide a list of supported options based on the CLI specification file 200.

In order to generate a CLI for a project of the configuration management system, the CLI generation component 130 may utilize a software module that generates CLIs by parsing input files, such as the CLI specification file 146. One example software module that the CLI generation component 130 may utilize is the 'argparse' module for the Python programming language. As discussed above, the CLI generation component 130 can generate a CLI in the DSL of the configuration management system in a convenient and user-friendly way. The CLI generation component 130 may process each pertinent section of the CLI specification file 200 (e.g., if a specific option of the CLI specification file 146 is referenced, then the section of the CLI specification file 200 corresponding to that option is processed) and generate the CLI to cause the project of the configuration management system to be executed.

In one implementation, CLI generation component 130 may utilize the CLI specification file 146 to perform verification of the user input prior to generating a CLI. The CLI generation component 130 may utilize the type and required values corresponding to the defined options of the CLI specification file 146 in order to verify whether the user-provided arguments are valid. For example, if a user provides a string value as an argument for an option that the CLI specification file 146 indicates uses a Boolean value, the CLI generation component 130 may issue an exception to the user informing the user of the error. Similarly, if a user did not provide arguments for an option that the CLI specification file 146 indicates requires an argument, then the CLI generation component 130 may issue an exception to the user informing the user of the error. The CLI generation component 130 may cause conditionals (e.g., conditional code), which check that the appropriate arguments for options are provided by a user, to be executed based on the defined options of the CLI specification file 146.

As a result of the above, the CLI management controller server 110 of a configuration management system can generate a user-friendly CLI for invoking DSL-based projects, with the ability to verify that required input was provided in the correct format.

Figure 3:
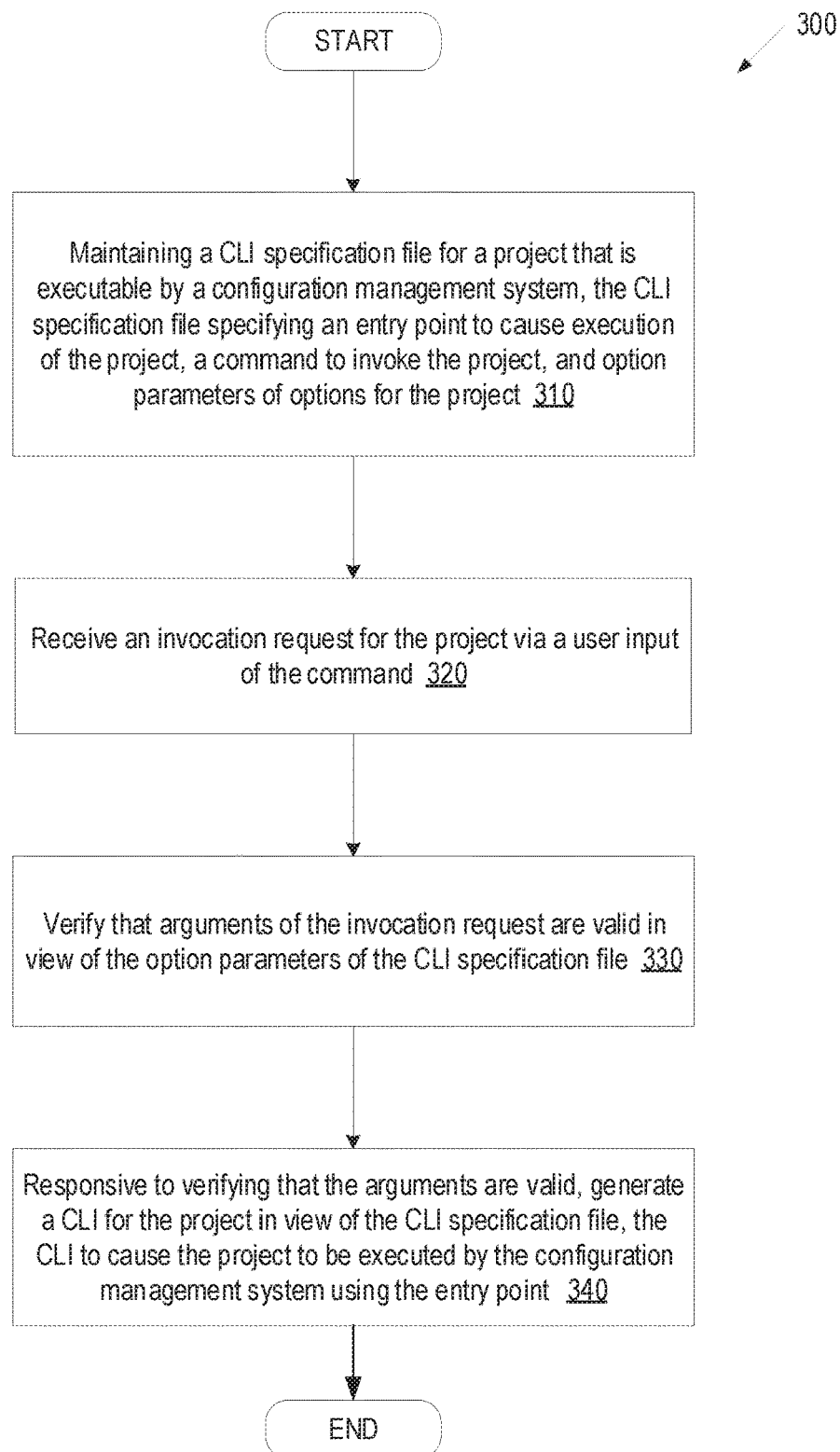
FIG. 3 depicts a flow diagram of an example method for generating a CLI for projects based on configuration management technologies in accordance with one or more aspects of the disclosure.
Figure 4:
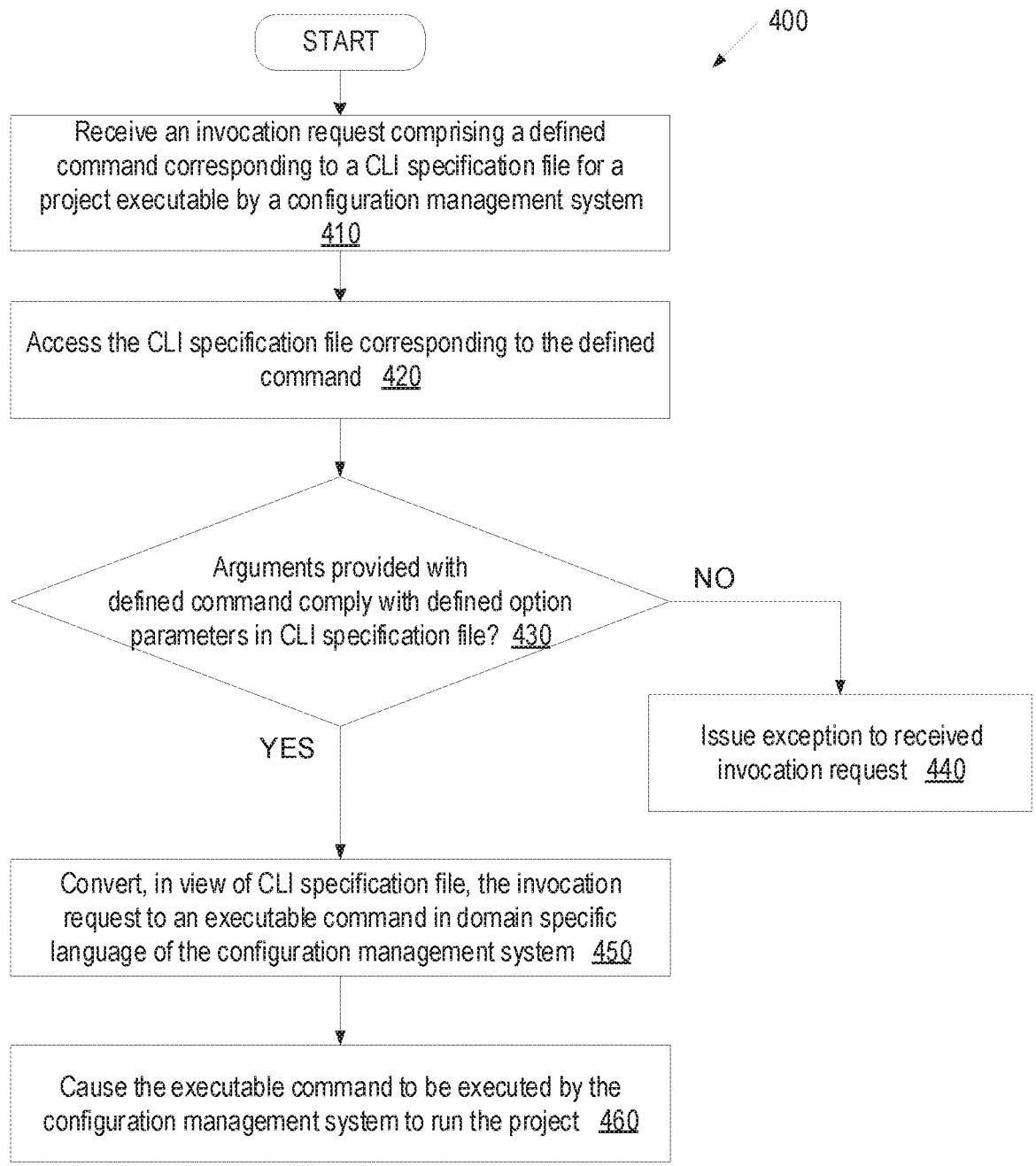
FIG. 4 depicts a flow diagram of an example method for generating a CLI for projects in view of domain specific language (DSL)-based configuration management technologies, in accordance with one or more aspects of the disclosure.

FIGS. 3 and 4 depict flow diagrams for illustrative examples of methods 300 and 400 for generating a command line interface for projects based on configuration management technologies, in accordance with one or more aspects of the disclosure. Method 300 illustrates an example process flow for generating a CLI for projects based on configuration management technologies, according to at least one implementation. Method 400 is an example process flow for generating a CLI for projects in view of DSL-based configuration management technologies, according to at least one implementation.

Methods 300 and 400 may be performed by processing devices that may comprise hardware (e.g., circuitry, dedicated logic, programmable logic, microcode, etc.), executable code (such as is run on a general purpose computer system or a dedicated machine), or a combination of both. Methods 300 and 400 and each of their individual functions, routines, subroutines, or operations may be performed by one or more processors of the computer device executing the method. In certain implementations, methods 300 and 400 may each be performed by a single processing thread. Alternatively, methods 300 and 400 may be performed by two or more processing threads, each thread executing one or more individual functions, routines, subroutines, or operations of the method. In an illustrative example, the processing threads implementing methods 300 and 400 may be synchronized (e.g., using semaphores, critical sections, and/or other thread synchronization mechanisms). Alternatively, the processes implementing methods 300 and 400 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or memory page media. In one implementation, methods 300 and 400 may be performed by computer system 100 as shown in FIG. 1.

Referring to FIG. 3, method 300 may be performed by processing devices of a server device or a client device and may begin at block 310. At block 310, a processing device may maintain a CLI specification file for a project that is executable by a configuration management system. In one implementation, the CLI specification file specifies an entry point to cause execution of the project, a command to invoke the project via the entry point, and option parameters of options of the project. Then, at block 320, the processing device may receive an invocation request for the project via a user input of the command.

Subsequently, at block 330, the processing device may verify that arguments of the invocation request are valid in view of the option parameters of the CLI specification file. Lastly, at block 340, the processing device may, responsive to verifying that the arguments are valid, generate a CLI for the project in view of the CLI specification file. In one implementation, the generated CLI can cause the project to be executed by the configuration management system using the entry point.

Referring to FIG. 4, method 400 may be performed by processing devices of a server device or a client device and may begin at block 410. At block 410, a processing device may receive an invocation request comprising a defined command corresponding to a command line interface (CLI) specification file for a project that is executable by a configuration management system. At block 420, the processing device may access the CLI specification file corresponding to the defined command. Subsequently, at decision block 430, the processing device may determine whether arguments provided with the invocation request comply with defined option parameters in the CLI specification file. If the arguments provided with the invocation do not comply with the defined option parameters, then method 400 proceeds to block 440 were an exception is issued to the received invocation request.

Referring back to decision block 430, if the arguments provided with the invocation request are determined to comply with the defined option parameters, method 400 proceeds to block 450 where the processing device may convert, in view of the CLI specification file, the invocation request to an executable command in a DSL of the configuration management system. Lastly, at block 460, the processing device may cause the executable command to be executed by the configuration management system to run the project.

Figure 5:
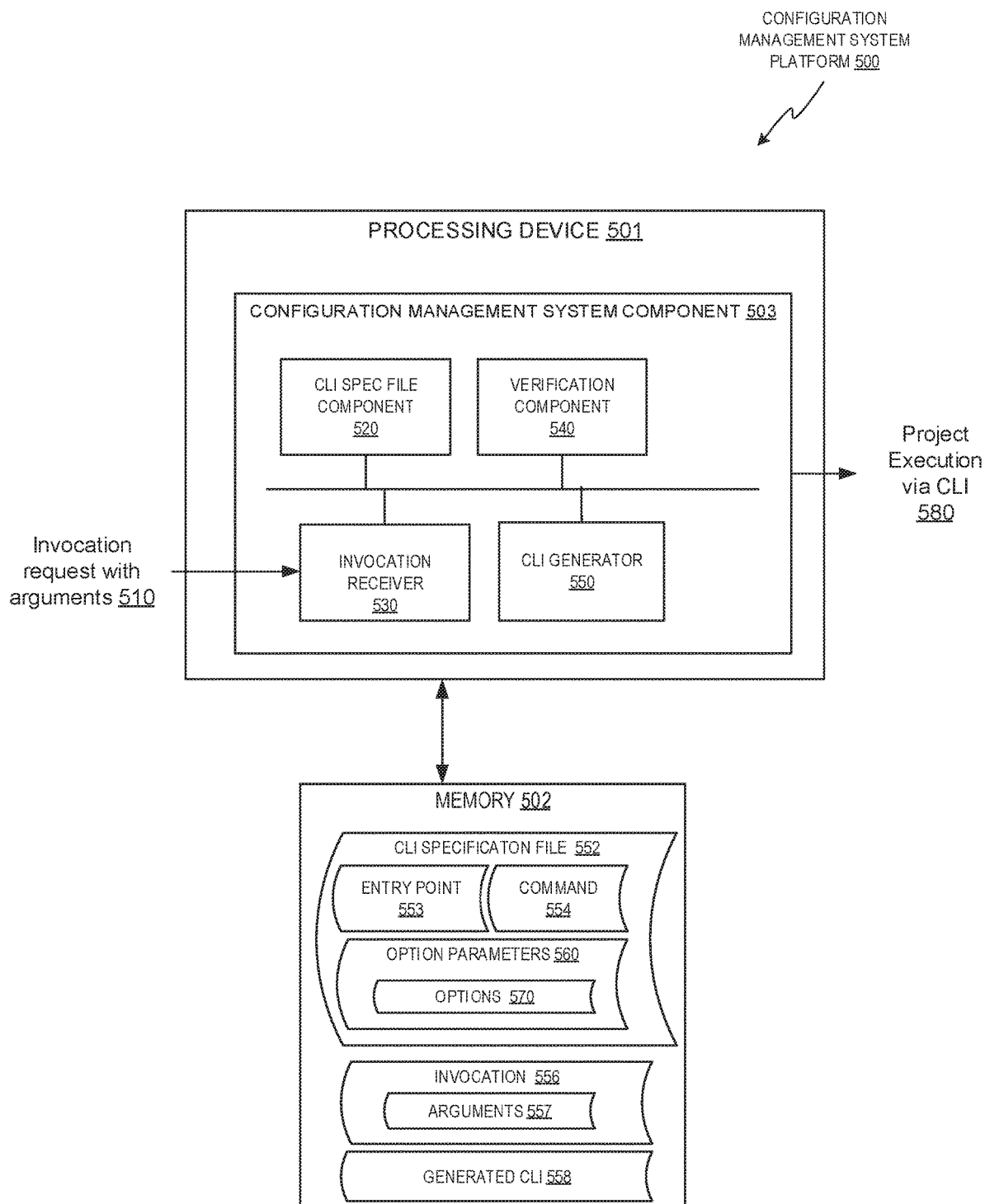
FIG. 5 depicts a block diagram of an example computer system in accordance with one or more aspects of the disclosure.

FIG. 5 depicts a block diagram of a configuration management system platform 500 operating in accordance with one or more aspects of the disclosure. Configuration management system platform 500 may be the same or similar to network architecture 100 and may include one or more processing devices 501 and one or more memory devices 502. In the example shown, the processing device 501 of configuration management system platform 500 may include a configuration management system component 503.

Configuration management system component 503 may include a CLI specification file component 520 that enables the processing device 501 to maintain a CLI specification file 552 for a project 580 that is executable by the configuration management system 500. In one implementation, the CLI specification file 552 may include an entry point 553 to cause execution of the project, a command 554 to invoke the project via the entry point, and option parameters 560 of options 570 of the project. The CLI specification file 552 and its corresponding inputs 553, 554, 560 may be stored in memory 502.

The configuration management system component 503 further includes an invocation request receiver 530 to receive 510 an invocation 556 for the project via the command 554. A verification component 540 of the configuration management system component 503 verifies that arguments 557 of the invocation 556 are valid in view of the option parameters 560 of the CLI specification file 552. A CLI generator 550 of the configuration management system component 503 generates, responsive to verifying that the arguments 557 are valid, a CLI 558 for the project in view of the CLI specification file 552. The generated CLI 558 may then cause 580 the project to be executed by the configuration management system platform 500.

Figure 6:
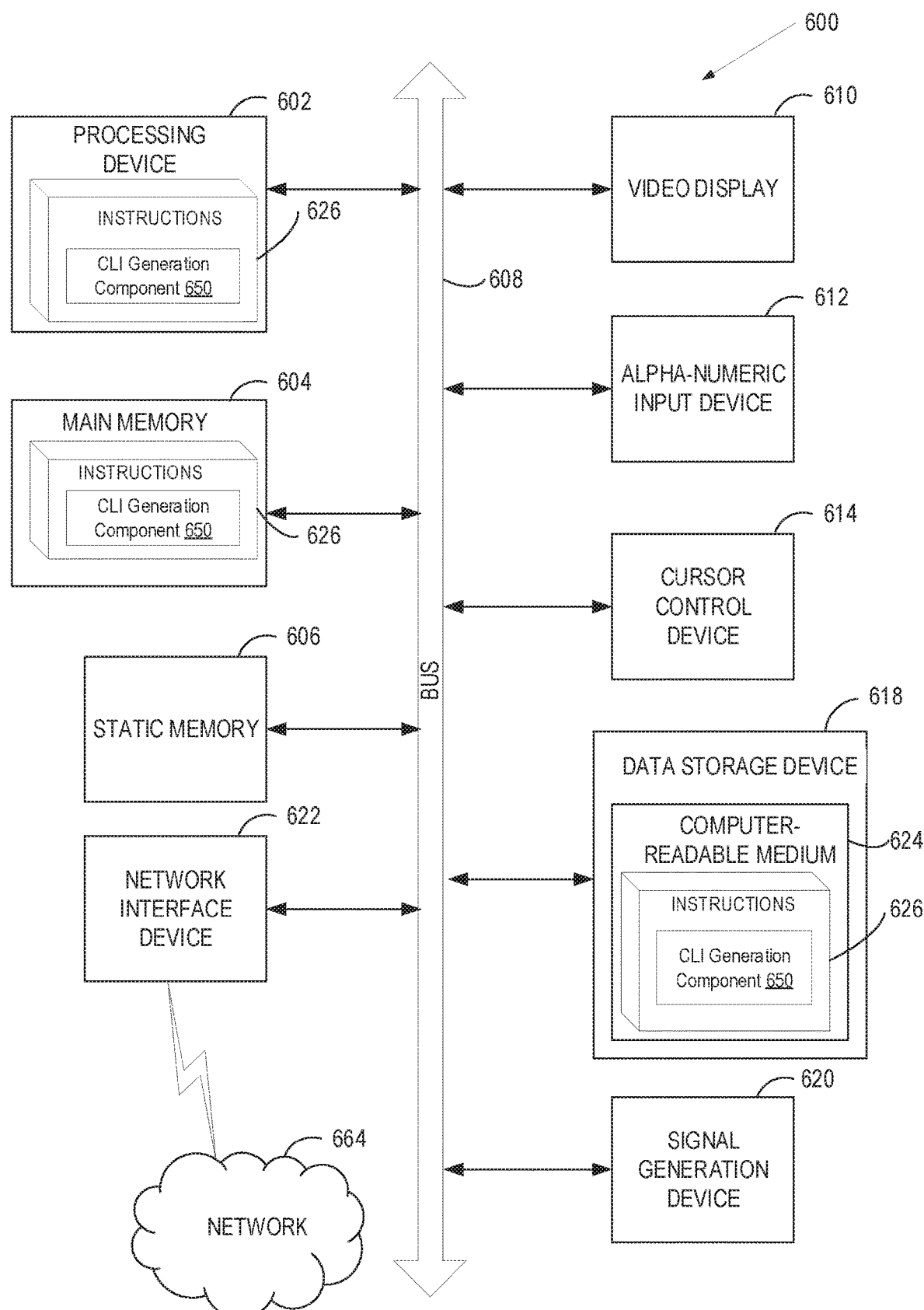
FIG. 6 depicts a block diagram of an illustrative computing device operating in accordance with the examples of the disclosure.

FIG. 6 depicts a block diagram of a computer system operating in accordance with one or more aspects of the disclosure. In various illustrative examples, computer system 600 may correspond to computer system 100 of FIG. 1. The computer system may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a computing device to translate these requests to the underlying physical computing hardware resources. This type of virtualization results in multiple VMs sharing physical resources.

In certain implementations, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 602, a volatile memory 604 (e.g., random access memory (RAM)), a non-volatile memory 606 (e.g., read-only memory (ROM) or electrically-erasable programmable ROM (EEPROM)), and a data storage device 616, which may communicate with each other via a bus 608.

Processing device 602 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 622. Computer system 600 also may include a video display unit 610 (e.g., an LCD), an alphanumeric input device 612 (e.g., a keyboard), a cursor control device 614 (e.g., a mouse), and a signal generation device 620.

Data storage device 616 may include a non-transitory computer-readable storage medium 624 on which may store instructions 626 encoding any one or more of the methods or functions described herein, including instructions for implementing methods 300 or 400 and for CLI generation component 650 (which may be the same as CLI generation component 130 of FIG. 1) and the modules illustrated in FIGS. 1 and 5.

Instructions 626 may also reside, completely or partially, within volatile memory 604 and/or within processing device 602 during execution thereof by computer system 600, hence, volatile memory 604 and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

Other computer system designs and configurations may also be suitable to implement the system and methods described herein.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "determining," "detecting," "verifying," "evicting," "selecting," "restricting," "receiving," "updating," "providing" or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 300 and/or each of its individual functions, routines, subroutines, or operations. Examples of the structure for a variety of these systems are set forth in the description above.

The above description is intended to be illustrative, and not restrictive. Although the disclosure has been described with references to specific illustrative examples and implementations, it will be recognized that the disclosure is not limited to the examples and implementations described. The scope of the disclosure should be determined with reference to the following claims, along with the full scope of equivalents to which the claims are entitled.

What is claimed is:

1. A method comprising:
maintaining, by a processing device, a command line interface (CLI) specification file for a project that is executable by a configuration management system, the CLI specification file specifying an entry point to cause execution of the project, a command to invoke the project via the entry point, and option parameters of options of the project;
receiving, by the processing device, an invocation request for the project via a user input of the command;
verifying, by the processing device, that arguments of the invocation request are valid in view of the option parameters of the CLI specification file; and
responsive to verifying that the arguments are valid, generating, by the processing device, a CLI for the project in view of the CLI specification file, the CLI to cause the project to be executed by the configuration management system using the entry point.

2. The method of claim 1, wherein the option parameters comprise a type of input for a respective option of the options, a help message description for the respective option, and a required indication for the respective option.

3. The method of claim 2, wherein the type of input comprises one of a string value, a Boolean value, or a comma-separated list.

4. The method of claim 1, further comprising, responsive to verifying that the arguments are invalid, issuing, by the processing device, an exception in response to the invocation request.

5. The method of claim 4, wherein the exception identifies an invalid option parameter of the option parameters.

6. The method of claim 1, wherein generating the CLI further comprises converting the invocation request to a domain specific language (DSL)-based command of the configuration management system that references the entry point.

7. The method of claim 1, wherein the CLI specification file comprises content received via a sequence of dialog boxes that guide a user through a series of defined operations corresponding to the content of the CLI specification file.

8. The method of claim 1, wherein the CLI specification file is generated in view of a template CLI specification file.

9. The method of claim 1, wherein the invocation request for the project is generated upon automatically accessing the CLI specification file in response to execution of the configuration management system without receiving arguments.

10. A system comprising:
a memory; and
a processing device communicably coupled to the memory to:
maintain, by a processing device, a command line interface (CLI) specification file for a project that is executable by a configuration management system, the CLI specification file specifying an entry point to cause execution of the project, a command to invoke the project via the entry point, and option parameters of options of the project;
receive an invocation request for the project via a user input of the command;

verify whether arguments of the invocation request are valid in view of the option parameters of the CLI specification file; and responsive to verifying that the arguments are valid, generate a CLI for the project in view of the CLI specification file, the CLI to cause the project to be executed by the configuration management system using the entry point.

11. The system of claim 10, wherein the option parameters comprise a type of input for a respective option of the options, a help message description for the respective option, and a required indication for the respective option.

12. The system of claim 10, wherein responsive to verifying that the arguments are invalid, the processing device is to issue an exception in response to the invocation request.

13. The system of claim 10, wherein, in generating the CLI, the processing device is to convert the invocation request to a domain specific language (DSL)-based command of the configuration management system that references the entry point.

14. The system of claim 10, wherein the CLI specification file comprises content received via a sequence of dialog boxes that guide a user through a series of defined operations corresponding to the content of the CLI specification file.

15. The system of claim 10, wherein the invocation request for the project is generated upon automatically accessing the CLI specification file in response to execution of the configuration management system without receiving arguments.

16. A non-transitory machine-readable storage medium storing instructions that cause a processing device to:

receive an invocation request, comprising a defined command corresponding to a command line interface (CLI) specification file designating an entry point, for a project that is executable by a configuration management system via the entry point;

access the CLI specification file corresponding to the defined command;

determine whether arguments provided with the invocation request comply with a set of defined option parameters in the CLI specification file;

responsive to determining that the arguments comply with the set of defined option parameters, generate a CLI in view of the CLI specification file, wherein, to generate the CLI, the processing device is to convert, in view of the CLI specification file, the invocation request to an executable command referencing the entry point in a domain specific language (DSL) of the configuration management system; and cause, using the CLI, the executable command to be executed by the configuration management system to run the project via the entry point.

17. The non-transitory machine-readable storage medium of claim 16, wherein the set of defined option parameters comprises a type of input for a respective option of the set of options, a help message description for the respective option, and a required indication for the respective option.

18. The non-transitory machine-readable storage medium of claim 16, wherein responsive to determining that the arguments do not comply with the defined option parameters, the processing device is further to issue an exception in response to the invocation request.

19. The non-transitory machine-readable storage medium of claim 16, wherein the CLI specification file comprises content received via a sequence of dialog boxes that guide a user through a series of defined operations corresponding to the content of the CLI specification file.

20. The system of claim 10, wherein the processing device is further to cause the DSL-based command to be executed by the configuration management system to run the project.

* * * * *